US012704006B2

(12) United States Patent
Longoria

(10) Patent No.: US 12,704,006 B2
(45) Date of Patent: Aug. 11, 2026

(54) AUTOMATIC SHOOTBOLT

(71) Applicant: Oscar Osciel Longoria, Fort Atkinson, WI (US)

(72) Inventor: Oscar Osciel Longoria, Fort Atkinson, WI (US)

(73) Assignee: HOPPE Holding AG, Müstair (CH)

( * ) Notice: Subject to any disclaimer, the term of this patent is extended or adjusted under 35 U.S.C. 154(b) by 445 days.

(21) Appl. No.: 18/322,726

(22) Filed: May 24, 2023

(65) Prior Publication Data

US 2023/0383581 A1 Nov. 30, 2023

Related U.S. Application Data

(60) Provisional application No. 63/346,656, filed on May 27, 2022.

(51) Int. Cl.
*E05C 1/08* (2006.01)
*E05C 1/00* (2006.01)

(52) U.S. Cl.
CPC ................ *E05C 1/08* (2013.01); *E05C 1/002* (2013.01)

(58) Field of Classification Search
CPC . E05C 1/08; E05C 1/002; E05B 55/12; E05B 63/20
See application file for complete search history.

(56) References Cited

U.S. PATENT DOCUMENTS

| | | | | | |
|---|---|---|---|---|---|
| 476,431 | A | * | 6/1892 | Treadwell | E05B 63/20 292/39 |
| 1,272,710 | A | * | 7/1918 | Ramsher | E05B 63/20 292/335 |
| 1,816,134 | A | * | 7/1931 | Wood | E05B 63/20 292/164 |
| 2,564,161 | A | * | 8/1951 | Koreska | E05B 55/12 70/151 R |
| 3,621,686 | A | * | 11/1971 | Klein | E05B 63/20 70/157 |
| 3,899,203 | A | * | 8/1975 | Heitz | E05B 63/20 292/DIG. 60 |
| 4,108,482 | A | * | 8/1978 | Dietrich | E05C 1/16 292/336.5 |
| 4,262,504 | A | * | 4/1981 | Inoue | E05B 47/0607 292/144 |
| 4,561,684 | A | * | 12/1985 | Marotto | E05B 63/20 292/1.5 |
| 4,677,834 | A | * | 7/1987 | Hicks | E05B 47/0002 70/279.1 |

(Continued)

*Primary Examiner* — Christine M Mills
*Assistant Examiner* — Faria F Ahmad
(74) *Attorney, Agent, or Firm* — Reinhart Boerner Van Deuren P.C.

(57) ABSTRACT

An automatic shootbolt system or use with a door is provided. The automatic shootbolt system includes a strike and an automatic shootbolt assembly. The automatic shootbolt assembly includes a frame, a shootbolt slidably carried, an actuation lever slidably carried, and a shootbolt latch that acts between the shootbolt and the actuation lever. Actuation of the actuation lever from an extended state towards a retracted state transitions the shootbolt latch from an engaged position to a released position to release the shootbolt such that the shootbolt can transition from a retracted position to an extended position.

11 Claims, 7 Drawing Sheets

(56) References Cited

U.S. PATENT DOCUMENTS

| | | | | | |
|---|---|---|---|---|---|
| 4,890,870 | A * | 1/1990 | Miron | E05B 63/20 | 292/333 |
| 5,666,830 | A * | 9/1997 | Litvin | E05B 9/00 | 292/335 |
| 5,820,173 | A * | 10/1998 | Fuller | E05C 9/041 | 70/487 |
| 6,045,169 | A * | 4/2000 | Frolov | E05B 63/202 | 292/335 |
| 6,679,087 | B2 * | 1/2004 | Suggs | E05B 65/0075 | 292/159 |
| 7,255,375 | B2 * | 8/2007 | Heid | E05B 65/0817 | 292/199 |
| 7,350,383 | B1 * | 4/2008 | Kuo | E05B 63/20 | 70/279.1 |
| 7,418,845 | B2 * | 9/2008 | Timothy | E05B 63/185 | 70/121 |
| 7,497,486 | B1 * | 3/2009 | Davis | E05B 15/0205 | 292/169.14 |
| 2017/0275922 | A1 * | 9/2017 | Zeus | E05C 9/1891 | |
| 2020/0131805 | A1 * | 4/2020 | Talpe | E05B 59/00 | |
| 2020/0270918 | A1 * | 8/2020 | Bogdanov | E05B 47/0673 | |
| 2021/0140207 | A1 * | 5/2021 | Phillips | E05C 7/06 | |
| 2024/0159080 | A1 * | 5/2024 | Huang | E05B 55/12 | |
| 2025/0172015 | A1 * | 5/2025 | Huang | E05B 63/08 | |

* cited by examiner

AUTOMATIC SHOOTBOLT

CROSS-REFERENCE TO RELATED PATENT APPLICATIONS

This patent application claims the benefit of U.S. Provisional Patent Application No. 63/346,656, filed May 27, 2022, the entire teachings and disclosure of which are incorporated herein by reference thereto.

FIELD OF THE INVENTION

This invention generally relates to latches for doors and more particularly to shootbolts for doors.

BACKGROUND OF THE INVENTION

Shootbolts are used to secure a door in a closed position. Typically, the shootbolt are actuated to extend outward from a side of the door and into a shootbolt receiver (e.g. opening or recess) of an adjacent component of the door (typically a door jamb or strike plate). Typically, shootbolts are projected through the manipulation of a lever (e.g. lifting the lever).

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
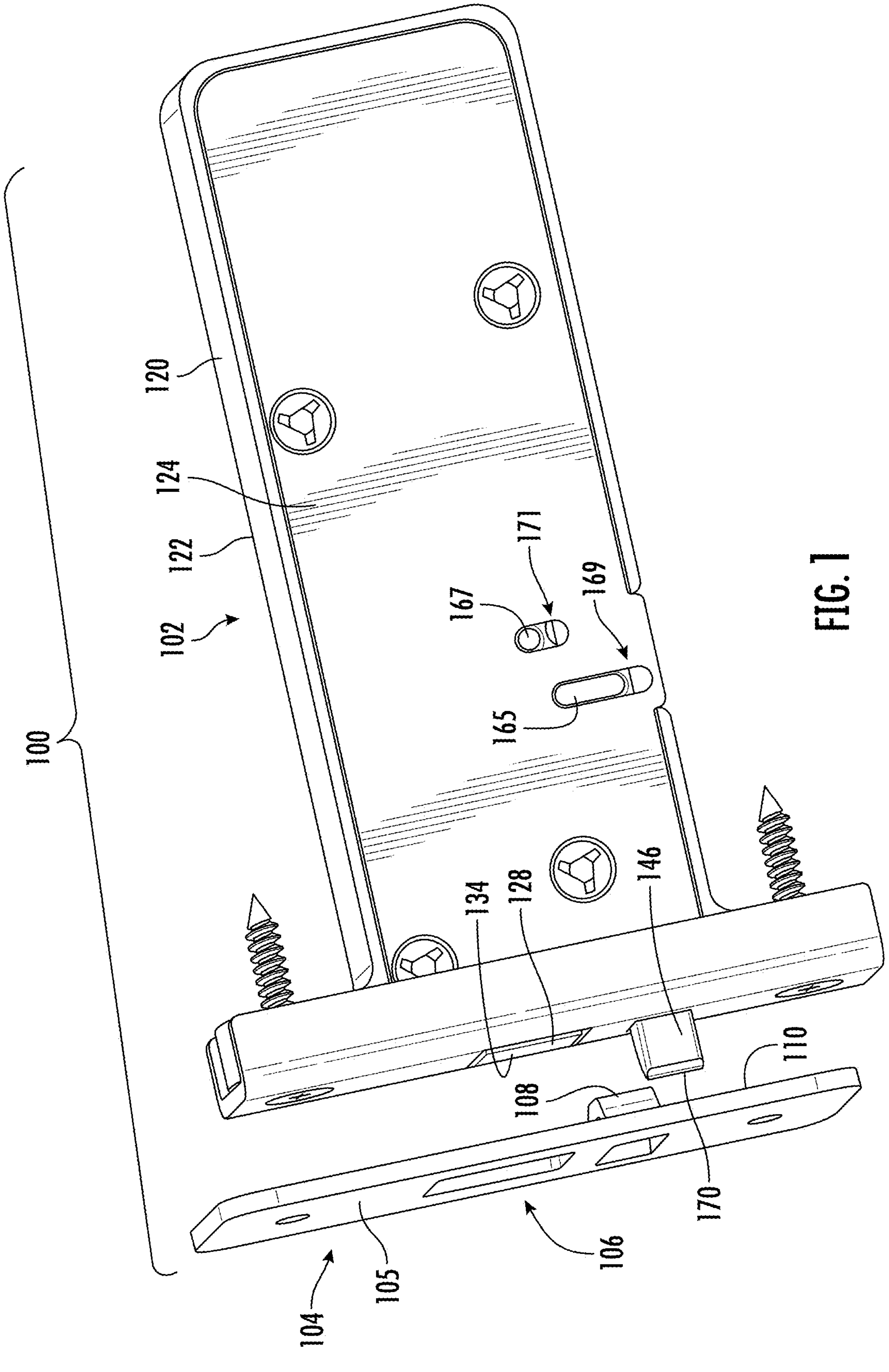
FIG. 1 is a perspective illustration of an automatic shootbolt system according to an example of the invention with the automatic shootbolt assembly having the shootbolt in a retracted position and the actuation lever in an extended position.

FIG. 1 illustrates an automatic shootbolt system 100 for use with a door having a door panel hingedly mounted to a door frame. The automatic shootbolt system 100 eliminates the need for the user to manipulate a lever to project the one or more shootbolts o the system. Instead, upon closing of the door, the shootbolt or shootbolts are automatically extended.

The location, geometry and actuation timing of a shootbolt allows for the shootobolt to aid in closing/sealing tall doors that may be warped or misaligned.

The door panel is pivotable between an open position and a closed position relative to the door frame. The shoot bolt assembly securing the door panel in the closed position relative to the door frame and selectively releaseable to allow the door to transition to the open position from the closed position.

The system 100 includes an automatic shootbolt assembly 102 that is selectively engaged with a strike 104 for securing the door in the closed position and selectively disengaged from the strike 104 to allow the door to transition to the open position.

In this example, the strike 104 is in the form of a plate mountable to the door frame, such as to the door jamb. The strike 104 includes a main body 105. The main body 105 of the strike 104 has a shootbolt receiver 106 that may be in the form of an aperture entirely through the main body 105 or a recess/pocket formed therein. The main body 105 of the strike 104 includes an actuation lever abutment 108 that is in the form of a raised projection in the illustrated embodiment. However, in other embodiments, the plate itself could form the actuation lever abutment.

In this embodiment, the main body 105 defines a front face 110 that faces towards the door panel when the door is in a closed position. The front face 110 faces away from the portion of the door frame to which it is mounted. The front face 110 surrounds the shootbolt receive 106. The actuation lever abutment 108 generally outward the rest of the main body 105 and the front face 110.

In other embodiments, the strike could be provided by the door frame itself and need not be a separate component mounted to the door frame. For instance, the shootbolt receiver 106 and actuation lever abutment 108 could be formed in or provided by a component of the frame.

In one example, the strike is provided in the threshold or the header (e.g. above or below the door panel when the door panel is in the closed position).

The automatic shootbolt assembly 102 includes a frame 120 that in this embodiment includes a main body 122 and a cover 124 mounted to the main body 122. The main body 122 and cover 124 define an internal cavity 126 (see e.g FIGS. 2 and 3). As such, the main body 122 and cover 124 may be considered a housing that holds other components of the automatic shootbolt assembly 102

Figure 2:
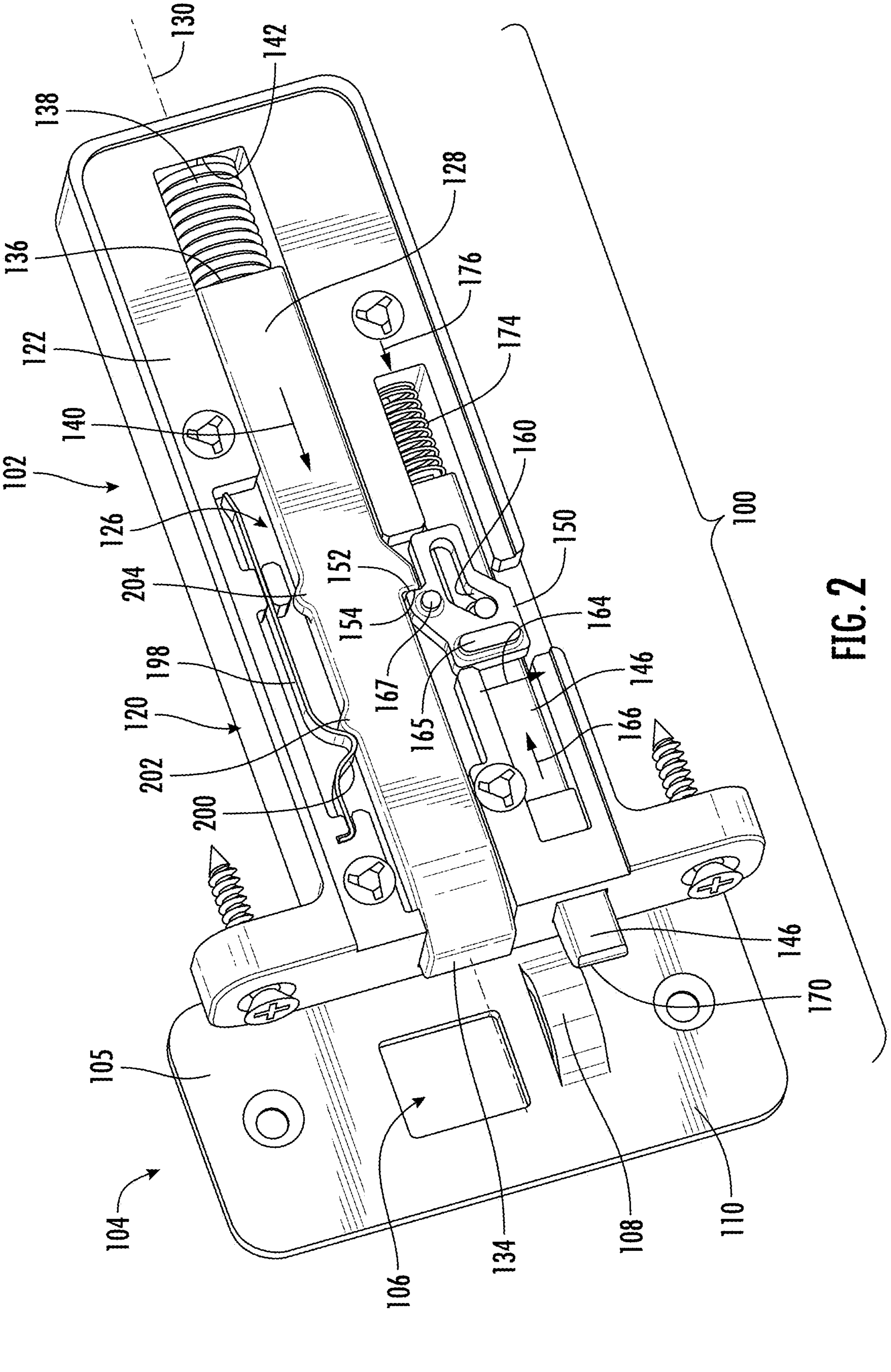
FIG. 2 is a perspective illustration of the automatic shootbolt system of FIG. 1 with a cover of the automatic shootbolt assembly removed.
Figure 3:
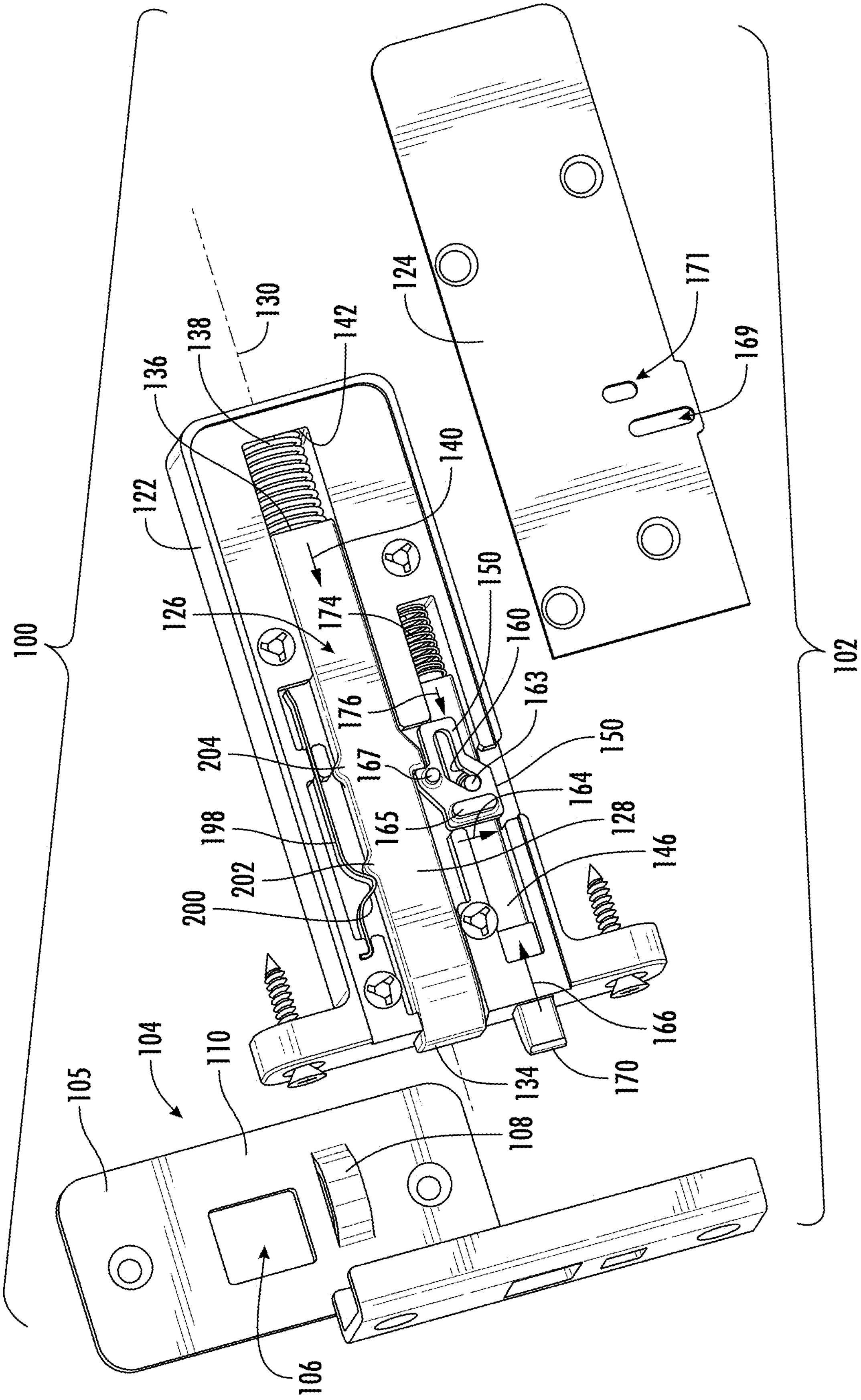
FIG. 3 is a partially exploded perspective illustration of the automatic shootbolt system of FIG. 1.
Figure 4:
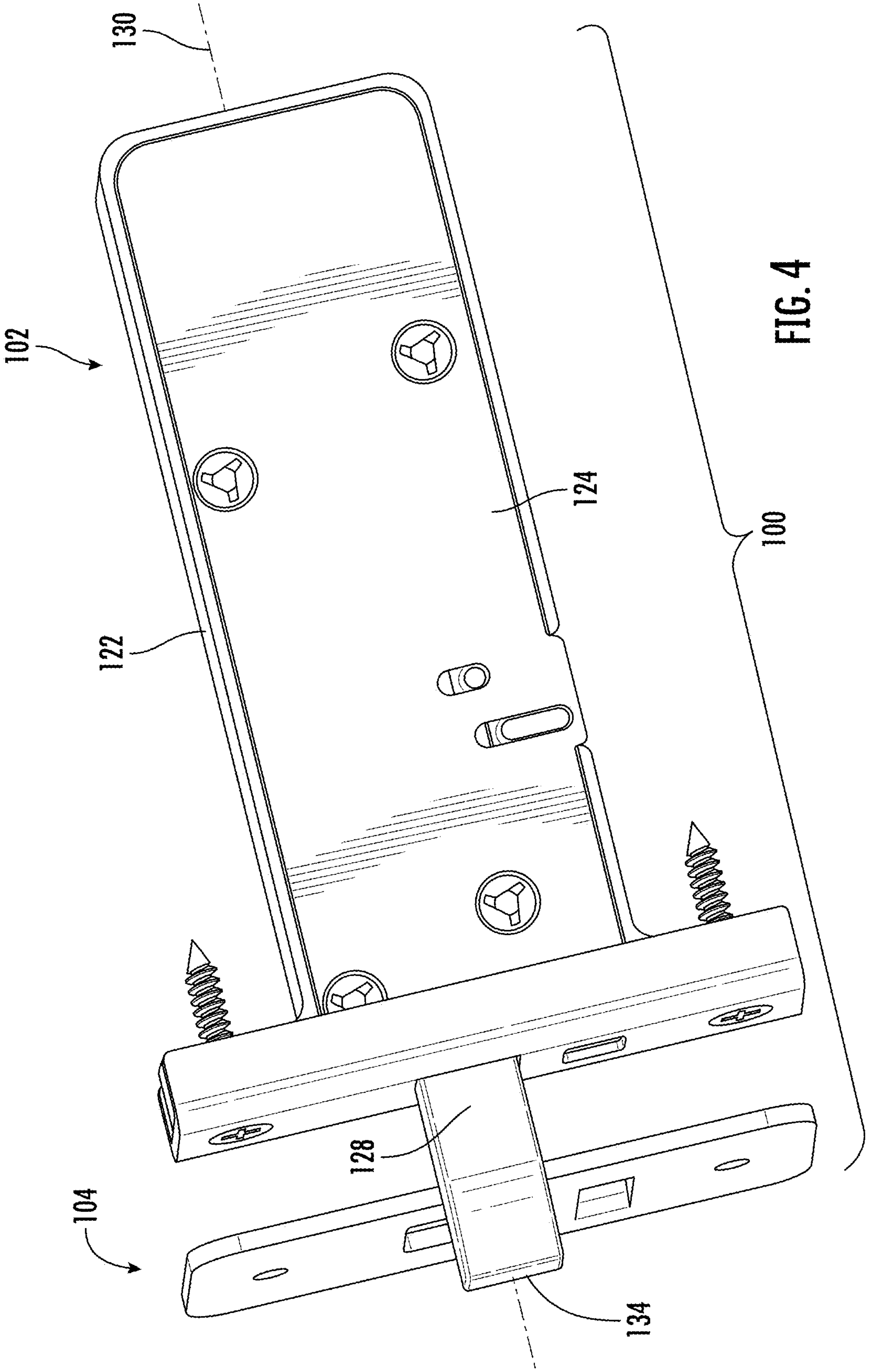
FIG. 4 is a perspective illustration of the automatic shootbolt system of FIG. 1 with the automatic shootbolt assembly having the shootbolt in an extended position and the actuation lever in a retracted position.
Figure 5:
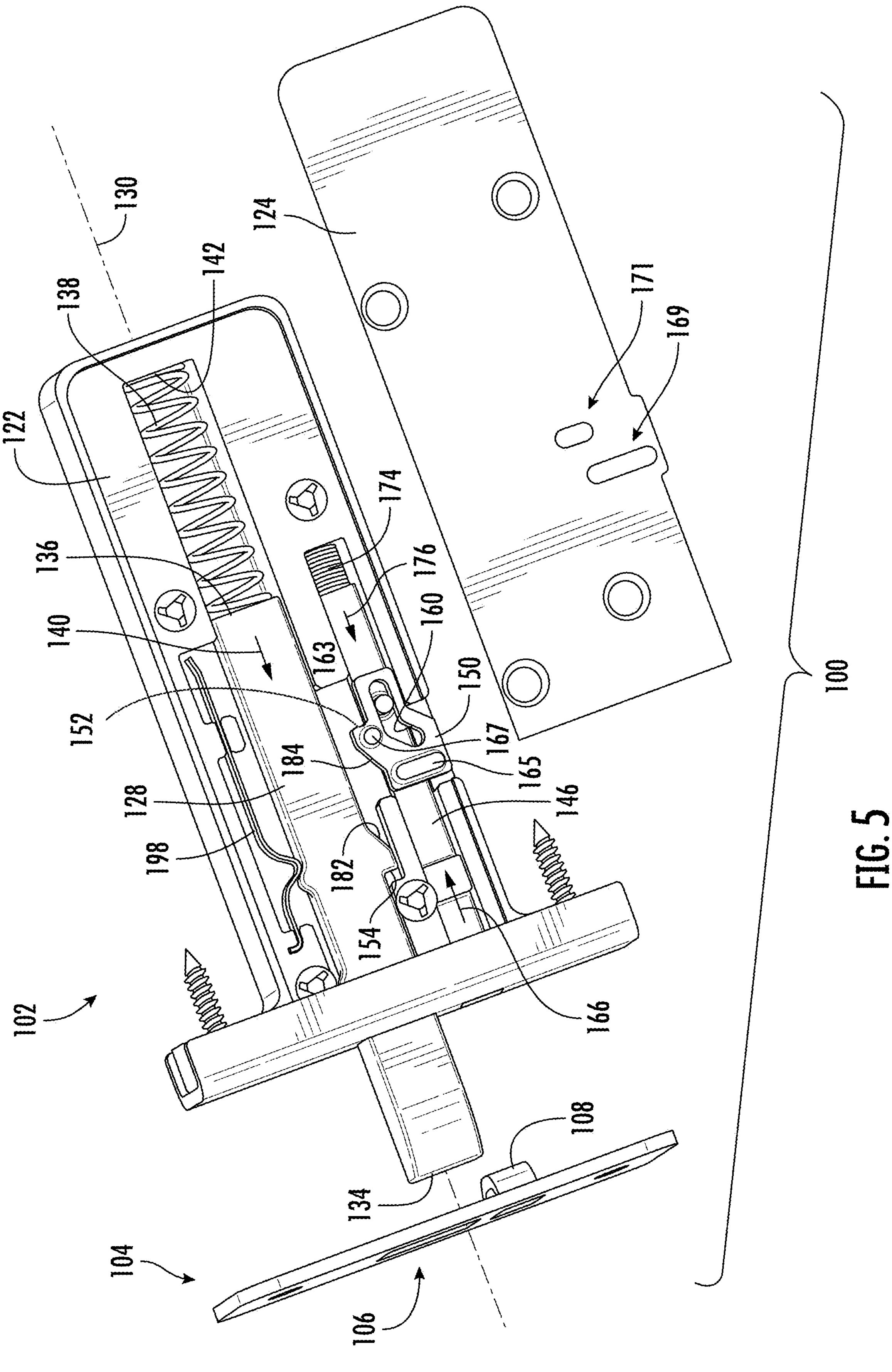
FIG. 5 is a partially exploded illustration of the automatic shootbolt system of FIG. 4.
Figure 6:
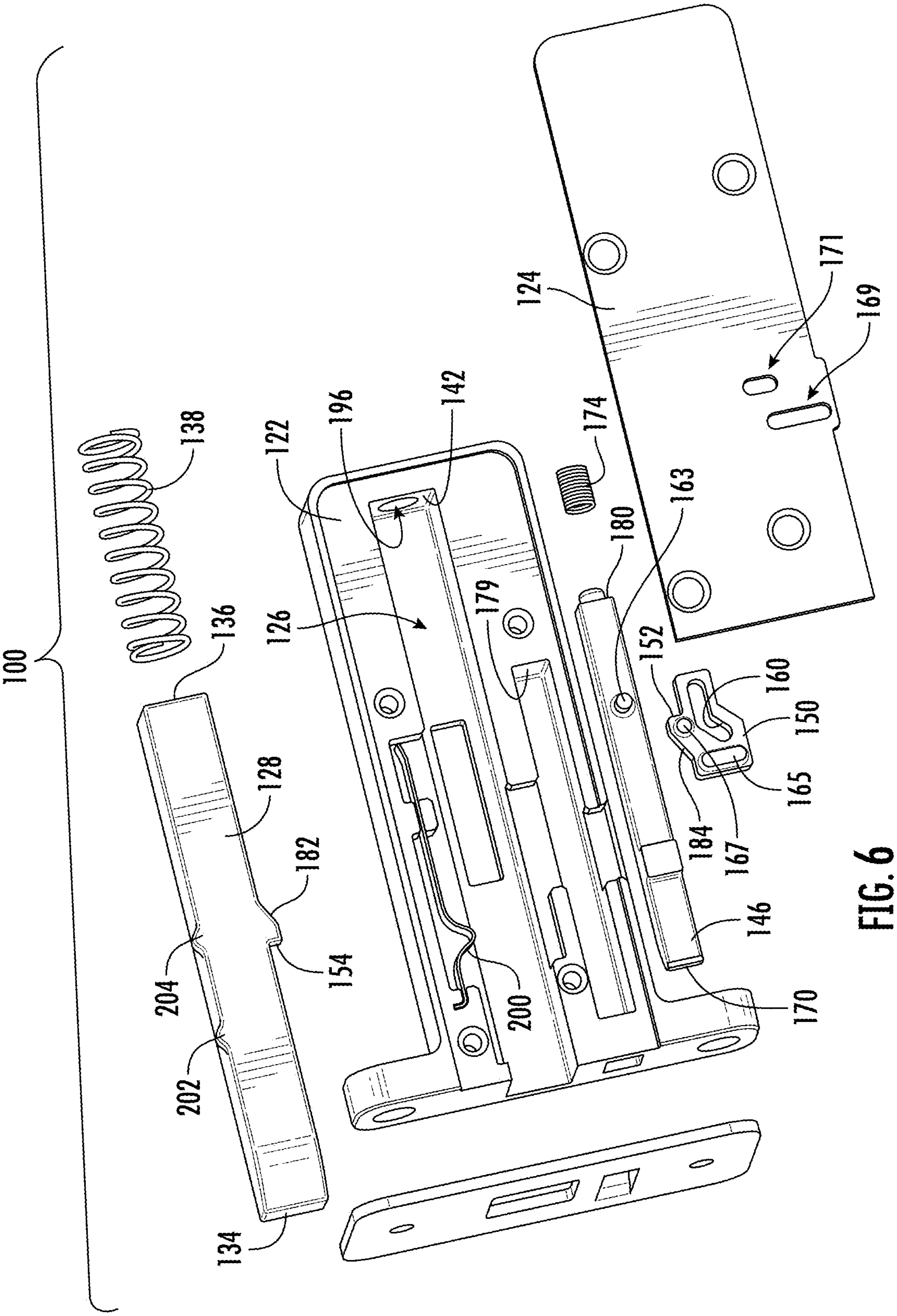
FIG. 6 is a further exploded illustration of the automatic shootbolt system of FIG. 1.

With principal reference to FIGS. 2 and 3, the automatic shootbolt assembly 102 includes a shootbolt 128 slidably carried for linear motion along a shootbolt axis 130 between a shootbolt retracted position (FIGS. 1-3) and a shootbolt extended position (FIGS. 4 and 5).

The shootbolt 128 extends between a first end 134 and a second end 136.

When the shootbolt 128 is in the extended position and aligned with the strike 102, the first end 134 extends into and shootbolt receiver 106 and engages the strike 104 to prevent opening the door relative to the door frame. In the extended position, the shootbolt 128 extends a first distance from the frame 120.

In the retracted position, the shootbolt 128 is retracted into the frame 120 or extends a second distance from the frame 120 that is less than the first distance such that the first end 134 is not extended into the shootbolt receiver 106 and/or does not otherwise engage the strike 102 that would prevent transitioning the door to the open position from the closed position.

A biasing member 138 biases the shootbolt in a first direction 140 towards the extended position. In this example, the biasing member 138 acts between the second end 136 and an abutment 142 of the main body 122.

The assembly 102 includes a shootbolt holding and release arrangement for selectively maintaining the shootbolt 128 in the retracted position and releasing the shootbolt 128 to allow the biasing member 138 to drive the shootbolt 128 to the extended position.

In one example, the shootbolt holding and release arrangement includes an actuation lever 146 slidably carried for linear motion parallel to the shootbolt axis 130 between an actuation lever retracted position (see e.g. FIGS. 4 and 5) and an actuation lever extended position (see e.g. FIGS. 1-3). The actuation lever 146 cooperates with a shootbolt latch 150 that is slidable, at least in part, transverse to the shootbolt axis 130 between a latched position (see e.g. FIG. 3) and a released position (see e.g. FIG. 5).

The shootbolt latch 150 has a shootbolt abutment 152 that has an abutment face that engages an abutment face of a latch abutment 154 of the shootbolt 128 when the shootbolt 128 is in the shootbolt retracted position, the actuation lever 146 is in the actuation lever extended position, and the shootbolt latch 150 is in the latched position. The engagement between the latch abutment 154 and the shootbolt abutment 152 prevents the shootbolt 128 from transitioning to the shootbolt extended position.

In this example, the latch abutment 154 and the shootbolt abutments 152 extend, at least in part, transverse to the shootbolt axis 130. This allows the engagement therebetween to prevent motion of the shootbolt 128 parallel to the shootbolt axis.

The shootbolt latch 150 has a cam surface 160 that cooperates with a cam actuator 163 of the actuation lever 146 to transition (as illustrated by arrow 164 in FIG. 2) the shootbolt latch 150 from the latched position (FIG. 3) to the released position (FIG. 5) when the actuation lever 146 is transitioned (as illustrated by arrow 166 in FIG. 2) from the actuation lever extended position (FIG. 2) to the actuation lever retracted position (FIG. 5).

More particularly and with reference to FIG. 2, as the actuation lever 146 moves in the direction illustrated by arrow 166, the cam surface 160 and the cam actuator 163 convert that motion into motion of the shootbolt latch 150 as illustrated by arrow 164. This causes the shootbolt latch 150 to disengage from the shootbolt 128 allowing biasing mechanism 138 to drive the shootbolt 128 to the extended position.

The cam surface 160 includes a tapered region that extends along a cam axis 191 (see e.g. FIG. 7) that is angled relative to the shootbolt axis 130. The cam actuator 163 slides along the tapered surface to convert linear motion of the actuation lever 146 between the extended state and retracted state to a lateral force driving the shootbolt latch 150 transversely to the shootbolt axis 130 from the latched position to the released position. The cam 160 includes a compensation region 193 that is parallel to the shootbolt axis 130. The cam actuator 163 is slidable relative to the compensation region 193. When the cam actuator 163 is in the compensation region 193, the cam actuator 163 does not actuate the shootbolt latch 150 transversely to the shootbolt axis 130. This prevents the actuation lever 146 from binding up when the door is transitioned to the closed position and allows for different gaps between the door and the door jamb/strike 104.

The shootbolt latch 150 includes a pair of shootbolt latch guide projections 165, 167 that extend outward from a main body of the shootbolt latch 150. These projections extend into corresponding elongated shootbolt latch guide slots 169, 171 of the cover 124 of the frame 120. Projection 165 is an axially elongated projection that is elongated in a generally perpendicular to the shootbolt axis 130. Corresponding slot 169 is similarly elongated generally perpendicular to the shootbolt axis 130. Projection 167 is a round projection and corresponding slot 171 is generally elongated perpendicular to shootbolt axis 130. Thus, the projections 165, 167 are slidable relative to the frame 120 generally perpendicular to the shootbolt axis 130. This cooperation between the projections 165, 167 and slots 169, 171 prevent the shootbolt latch 146 from moving parallel to shootbolt axis 130 when the actuation lever 146 is driven from the extended position to the retracted position.

The automatic shootbolt assembly 102 is automatic because actuation of the actuation lever 146 from the extended position to the retracted position occurs automatically as the door is transitioned from an open position the closed position relative to the strike 104, e.g. from a position where the shootbolt 128 is not aligned with the shootbolt receiver 106 to a position where the shootbolt 128 is aligned with the shootbolt receiver 106. In particular, first end 170 of the actuation lever 146 will engage the actuation lever abutment 108 of the strike 104. This will drive the actuation lever 146 as illustrated by arrow 166 to the actuation lever retracted position. This automatic motion of the actuation lever 146 will automatically disengage the shootbolt latch 150 from the shootbolt 128 allowing the shootbolt 128 to be driven to the shootbolt extended position from the shootbolt retracted position by biasing mechanism 138. All of this occurs without requiring manual actuation of any levers or handles of the door.

In this example, a biasing member 174 biases the actuation lever 146 towards the extended position as illustrated by arrow 176 in FIG. 2. Thus, as the door is transitioned to the closed position, end 170 engages and is biased by the actuation lever abutment 108 to release shootbolt 128.

The biasing member 174 acts between an abutment 179 of the main body 122 and a second end 180 of the actuation lever 146.

When the automatic shootbolt system 100 is in a locked position, e.g. the shootbolt 128 is in the shootbolt extended position and engaged with the strike 104 (e.g. received in shootbolt receiver 106), the system is manually reset by the user. More particularly, the user will actuate a handle operably coupled to the shootbolt 128.

With the handle actuated such that the shootbolt 128 is returned to the shootbolt retracted position, the user will transition the door from the closed position to the open position (e.g. from the position where the shootbolt 128 is aligned with shootbolt receiver 106 to the position where the shootbolt 128 is no longer aligned with the shootbolt receiver 106). Once the door has moved sufficiently far that the actuation lever 146, and particularly end 170, is no longer engaged with the actuation lever abutment 106, the actuation lever 146 will be automatically transitioned from the actuation lever retracted position to the actuation lever extended position due to biasing force provided by biasing mechanism 174. In other words, the actuation lever 146 will be actuated in the direction illustrated by arrow 176.

This actuation of the actuation lever 146 will also drive the shootbolt latch 150 in a direction opposite arrow 164 and towards the shootbolt 128. This is due to the cam actuator 163 cooperating with a different portion of the cam surface 160. The actuation of shootbolt latch 150 will drive it to the latched position from the released position such that the shootbolt abutment 152 will interfere with and engage the latch abutment 154 when the user releases the handle of the door and the biasing member 138 again biases the shootbolt 128 towards the shootbolt extended position. As noted above, the engagement of the abutments 152, 154 will prevent the shootbolt 128 from transitioning to the shootbolt extended position.

In some examples, the handle will retract a normal door latch when it is actuated to reset the shootbolt 128.

Figure 7:
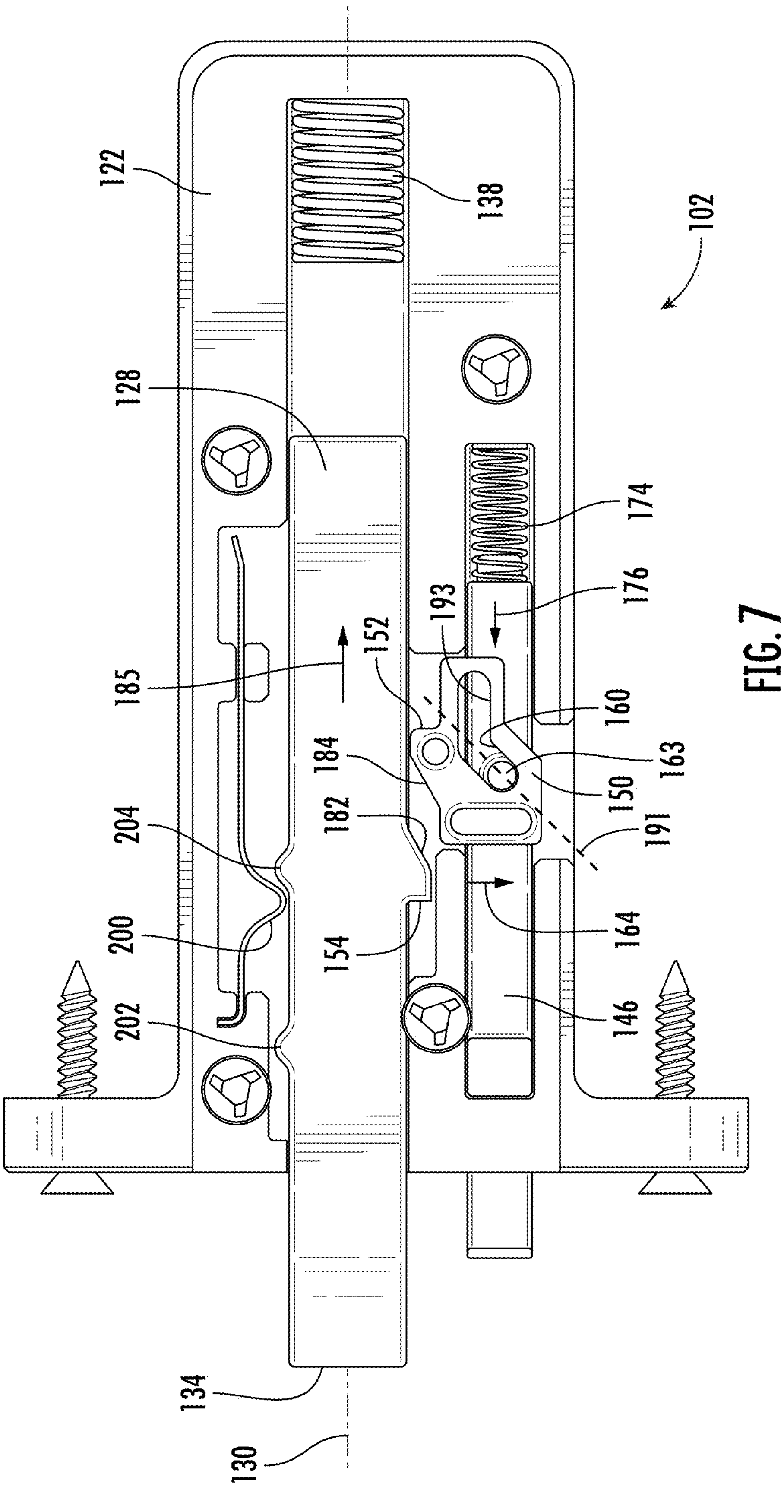
FIG. 7 illustrates the automatic shootbolt assembly of the system of FIG. 1 with the shootbolt and the actuation lever both in extended positions.

In the event that the shootbolt 128 is released and actuated to the shootbolt extended position while the door is in the open position such that the actuation lever 146 is also in the actuation lever extended position, as illustrated in FIG. 7, the shootbolt 128 and shootbolt latch 150 have a reset arrangement to allow for resetting of the shootbolt 128.

In this example, the reset arrangement is provided by first and second reset cam surfaces 182, 184 provided by the shootbolt 128 and shootbolt latch 150, respectively. The first and second reset cam surfaces 182, 184 are configured to drive the shootbolt latch 150 laterally outward from the latched position to the released position as illustrated by arrow 164 when the shootbolt 128 is transitioned from the shootbolt extended position to the shootbolt retracted position, as illustrated by arrow 185.

As the shootbolt latch 150 is driven toward the released position, the actuation lever 146 will also be driven in the direction illustrated by arrow 185 due to the cooperation of cam surface 160 and cam actuator 163 thereby compressing biasing member 174.

Once the latch abutment 154 of the shootbolt 128 passes the shootbolt abutment 152 of the shootbolt latch 150 such that the two abutments 152, 154 are facing one another, the biasing member 174 will drive the actuation lever 146 opposite arrow 185 and in the direction of arrow 176. This movement will once again drive shootbolt latch 150 back to the latched position such that when the shootbolt 128 is released and biasing member 138 biases the shootbolt back towards the shootbolt extended position, the abutments 152, 154 will once again engage and retain the shootbolt 128 in the shootbolt retracted position. As such, the automatic shootbolt assembly 102 can be reset.

In this example, the first and second reset cams 182, 184 are tapered surfaces relative to the shootbolt axis 130. However, in other examples, only one of the first and second reset cams 182, 184 need be a tapered surface. The tapered arrangement of one of the first and second reset cams 182, 184 converts the linear motion of the shootbolt 128 as it transitions from the shootbolt extended position to the shootbolt retracted position into the lateral motion of the shootbolt latch 150 from the latched position to the released position as illustrated by arrow 164.

Typically, the automatic shootbolt assembly 100 would be mounted in the top or bottom of a door such that the strike 104 would be above or below the door when the door is in the closed position.

A rod or other connector can extend through the door between the user manipulatable handle and the shootbolt 128. The frame 122 includes an opening 196 through which the rod can extend to connect to the shootbolt 128.

A dampening spring 198 cooperates with the shootbolt 128 to dampen actuation speed and motion of the shootbolt 128. The dampening spring 198 has a projection 200 that cooperates with projections 202, 204 on the shootbolt 128 as the shootbolt 128 slides relative to main body 122 of the frame 120.

In some examples, the automatic shootbolt system uses an anti-backdrive feature that prevents external forces from driving the shootbolt into the unlocked position from the locked position.

In the event that the automatic shootbolt system does not deploy the shootbolt into the strike fully, the user can still operate the lever and manually drive the shootbolts into the locked position All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An automatic shootbolt assembly comprising:

a frame;

a shootbolt slidably carried for linear motion along a shootbolt axis between a shootbolt retracted position and a shootbolt extended position, the shootbolt having a latch abutment, the shoot bolt having a first projection extending outward generally perpendicular to the shoot bolt axis;

a biasing member biasing the shootbolt in a first direction towards the extended position;

an actuation lever slidably carried for linear motion parallel to the shootbolt axis between an actuation lever retracted position and an actuation lever extended position, the actuation lever having a cam actuator;

a shootbolt latch slidable transverse to the shootbolt axis between a latched position and a released position, the shootbolt latch having a shootbolt abutment that engages the latch abutment when the shootbolt is in the shootbolt retracted position, the actuation lever is in the actuation lever extended position, and the shootbolt latch is in the latched position, the engagement between the latch abutment and the shootbolt abutment preventing the shootbolt from transitioning to the shootbolt extended position, the shootbolt latch having a cam surface that cooperates with the cam actuator to transition the shootbolt latch from the latched position to the released position when the actuation lever is transitioned from the actuation lever extended position to the actuation lever retracted position;

a dampening spring having a spring projection extending generally perpendicular to the shoot bolt axis, the spring projection being positioned on a first side of the first projection in the shootbolt extended position and on a second opposite side of the first projection in the shootbolt retraced position, the spring projection engaging the first projection to dampen the speed of the shootbolt as the shootbolt transitions from the shootbolt retracted position to shootbolt extend position.

2. An automatic shootbolt assembly comprising:

a frame;

a shootbolt slidably carried for linear motion along a shootbolt axis between a shootbolt retracted position and a shootbolt extended position, the shootbolt having a latch abutment;

a biasing member biasing the shootbolt in a first direction towards the extended position;

an actuation lever slidably carried for linear motion parallel to the shootbolt axis between an actuation lever retracted position and an actuation lever extended position, the actuation lever having a cam actuator;

a shootbolt latch slidable transverse to the shootbolt axis between a latched position and a released position, the shootbolt latch having a shootbolt abutment that engages the latch abutment when the shootbolt is in the shootbolt retracted position, the actuation lever is in the actuation lever extended position, and the shootbolt latch is in the latched position, the engagement between the latch abutment and the shootbolt abutment preventing the shootbolt from transitioning to the shootbolt extended position, the shootbolt latch having a cam surface that cooperates with the cam actuator to transition the shootbolt latch from the latched position to the released position when the actuation lever is transitioned from the actuation lever extended position to the actuation lever retracted position;

wherein;

the frame defines a shootbolt latch guide slot that is elongated along guide slot axis that is transverse to the shootbolt axis; and the shootbolt latch includes a guide projection being received within the shootbolt latch guide slot parallel to the guide slot axis between the latched and released positions.

3. An automatic shootbolt assembly comprising:

a frame;

a shootbolt slidably carried for linear motion along a shootbolt axis between a shootbolt retracted position and a shootbolt extended position, the shootbolt having a latch abutment;

a biasing member biasing the shootbolt in a first direction towards the extended position;

an actuation lever slidably carried for linear motion parallel to the shootbolt axis between an actuation lever retracted position and an actuation lever extended position, the actuation lever having a cam actuator;

a shootbolt latch slidable transverse to the shootbolt axis between a latched position and a released position, the shootbolt latch having a shootbolt abutment that engages the latch abutment when the shootbolt is in the shootbolt retracted position, the actuation lever is in the actuation lever extended position, and the shootbolt latch is in the latched position, the engagement between the latch abutment and the shootbolt abutment preventing the shootbolt from transitioning to the shootbolt extended position, the shootbolt latch having a cam surface that cooperates with the cam actuator to transition the shootbolt latch from the latched position to the released position when the actuation lever is transitioned from the actuation lever extended position to the actuation lever retracted position;

wherein:

the latch abutment extends transversely relative to the shootbolt axis; and the shootbolt abutment extends transversely relative to the shootbolt axis the shootbolt has a first reset cam surface and the shootbolt latch has a second reset cam surface; and one of the first reset cam surface and the second reset cam surface being angled relative to the shootbolt axis such that if the shootbolt latch is in the latched position and the shootbolt is transitioned from the shootbolt extended position to the shootbolt retracted position the first and second reset cam surfaces will contact one another and drive the shootbolt latch from the latched position to the released position.

4. The automatic shootbolt assembly of claim 3, further comprising a second biasing member biasing the actuation lever towards the actuation lever extended position.

5. The automatic shootbolt assembly of claim 2, wherein:

the latch abutment extends transversely relative to the shootbolt axis; and the shootbolt abutment extends transversely relative to the shootbolt axis.

6. The automatic shootbolt assembly of claim 2, wherein the interaction of the guide projection with the portion of the frame defining the shootbolt latch guide slot prevents the shootbolt latch from moving parallel to the shootbolt axis when the latch abutment is engaged with the shootbolt abutment.

7. The automatic shootbolt assembly of claim 5, wherein:

the shootbolt abutment includes a shootbolt abutment face;

the latch abutment includes a latch abutment face, the latch abutment face abuts and faces the shootbolt abutment face when the shootbolt abutment is engaged with the latch abutment, the latch abutment face faces away from the shootbolt abutment face when the shootbolt is in the extended position.

8. The automatic shootbolt assembly of claim 2, wherein the cam surface includes a tapered region that extends along a cam axis that is angled relative to the shootbolt axis, the cam actuator sliding along the tapered surface to convert linear motion of the actuation lever between the extended state and retracted state to a lateral force driving the shootbolt latch transversely to the shootbolt axis from the latched position to the released position.

9. An automatic shootbolt assembly comprising:

a frame;

a shootbolt slidably carried for linear motion along a shootbolt axis between a shootbolt retracted position and a shootbolt extended position, the shootbolt having a latch abutment;

a biasing member biasing the shootbolt in a first direction towards the extended position;

an actuation lever slidably carried for linear motion parallel to the shootbolt axis between an actuation lever retracted position and an actuation lever extended position, the actuation lever having a cam actuator;

a shootbolt latch slidable transverse to the shootbolt axis between a latched position and a released position, the shootbolt latch having a shootbolt abutment that engages the latch abutment when the shootbolt is in the shootbolt retracted position, the actuation lever is in the actuation lever extended position, and the shootbolt latch is in the latched position, the engagement between the latch abutment and the shootbolt abutment preventing the shootbolt from transitioning to the shootbolt extended position, the shootbolt latch having a cam surface that cooperates with the cam actuator to transition the shootbolt latch from the latched position to the released position when the actuation lever is transitioned from the actuation lever extended position to the actuation lever retracted position wherein:

the cam surface includes a tapered region that extends along a cam axis that is angled relative to the shootbolt axis, the cam actuator sliding along the tapered surface to convert linear motion of the actuation lever between the extended state and retracted state to a lateral force driving the shootbolt latch transversely to the shootbolt axis from the latched position to the released position the cam surface includes a compensation region that is parallel to the shootbolt axis; and the cam actuator slidable relative to the compensation region, the cam actuator not actuating the shootbolt latch transversely to the shootbolt axis when sliding relative to the compensation region.

10. The automatic shootbolt assembly of claim 1, wherein:

the shoot bolt includes a second projection extending outward generally perpendicular to the shootbolt axis;

the first and second projections are spaced a part parallel to the shoot bolt axis forming a gap therebetween;

the spring projection being positioned external of the gap when the shootbolt is in the shootbolt retracted position and the spring projection being positioned within the gap between the first and second projections when the shootbolt is in the shootbolt extended position.

11. The automatic shootbolt system of claim 1, wherein the strike main body and the projection providing the actuation lever abutment are formed from a single continuous piece of material.

* * * * *